(12) United States Patent
Chiu

(10) Patent No.: US 11,807,032 B2
(45) Date of Patent: Nov. 7, 2023

(54) COMPOSITE MATERIAL SHELL AND MANUFACTURING METHOD FOR THE SAME

(71) Applicant: Corex Materials Corporation, Taichung (TW)

(72) Inventor: Shao-Chen Chiu, Taichung (TW)

(73) Assignee: Corex Materials Corporation, Taichung (TW)

( * ) Notice: Subject to any disclaimer, the term of this patent is extended or adjusted under 35 U.S.C. 154(b) by 290 days.

(21) Appl. No.: 17/185,568

(22) Filed: Feb. 25, 2021

(65) Prior Publication Data
US 2022/0144010 A1 May 12, 2022

(30) Foreign Application Priority Data
Nov. 10, 2020 (TW) .................................. 109139231

(51) Int. Cl.
*B44C 3/12* (2006.01)
*B32B 3/14* (2006.01)
*B32B 5/12* (2006.01)
*B44C 1/28* (2006.01)
*H04M 1/02* (2006.01)

(52) U.S. Cl.
CPC .................. *B44C 3/12* (2013.01); *B32B 3/14* (2013.01); *B32B 5/12* (2013.01); *B44C 1/28* (2013.01); *B44C 3/123* (2013.01); *B32B 2451/00* (2013.01); *H04M 1/0283* (2013.01)

(58) Field of Classification Search
CPC .. B44C 3/12; B44C 3/123; B44C 1/28; B32B 3/14; B32B 5/12; B32B 2451/00; H04M 1/0283
See application file for complete search history.

(56) References Cited

U.S. PATENT DOCUMENTS

| 2013/0082885 A1* | 4/2013 | Chiang | B29C 70/08 343/702 |
| 2015/0349405 A1* | 12/2015 | Sun | B29C 70/345 343/702 |
| 2022/0410505 A1* | 12/2022 | Wang | C08J 5/042 |

FOREIGN PATENT DOCUMENTS

| EP | 1134314 | 9/2001 |
| JP | H03-228854 A | 10/1991 |
| JP | H06-64115 A | 3/1994 |

(Continued)

OTHER PUBLICATIONS

English summary of purpose/problem solved and solution or composition provided by each reference cited in related Japan application serial No. 2021-041585 issued on May 24, 2022.

(Continued)

*Primary Examiner* — Jasper Saberi
(74) *Attorney, Agent, or Firm* — Apex Juris, pllc; R. Lynette Wylie

(57) ABSTRACT

A composite material shell having a base plate made of thermoplastic resin and reinforcing fibers and multiple decorative pieces. Each of the multiple decorative pieces is made of a composite material containing thermoplastic resin and reinforcing fibers. An area of each of the multiple decorative pieces is smaller than an area of the base plate, wherein the multiple decorative pieces are non-directionally arranged, are overlapped, and are welded on the base plate whereby the composite material shell provides unique reflection and depth variations of visual effect.

8 Claims, 9 Drawing Sheets

(56) References Cited

FOREIGN PATENT DOCUMENTS

| JP | 2000-37819 | A | 2/2000 |
| JP | 2005-335370 | A | 12/2005 |
| TW | M480713 | | 6/2014 |
| TW | 201518058 | A | 5/2015 |

OTHER PUBLICATIONS

English abstract for TW201518058, Total of 1 page.
English abstract for EP1134314, Total of 1 page.

* cited by examiner

COMPOSITE MATERIAL SHELL AND MANUFACTURING METHOD FOR THE SAME

BACKGROUND OF THE INVENTION

1. Field of the Invention

The present invention relates to a shell for protection, and more particularly to a composite material shell that can provide unique reflection and depth variations of visual effect and a manufacturing method of the composite material shell.

2. Description of Related Art

With the increasing popularity of electronic devices, people purchase protective shells such as protective sleeves or protective cases and wrap those protective shells on the sophisticated and expensive electronic devices for protection. In addition to protecting the electronic devices, a pattern on the protective shell turns into a decoration that represents personal taste as well.

In addition to silicon, polycarbonate or thermoplastic polyurethane, conventional protective shells are also made of fiber composite material. The conventional protective shells made of fiber composite material are light and stiff, and also the regular patterns thereon, such as parallel strips or interlacing strips, make the conventional protective shells popular with customers.

However, as the conventional protective shells made of fiber composite material become more and more common, the regular patterns of the conventional protective shells gradually fail to fulfill demand for highlighting individual differences. The conventional manufacturing method of the protective shells made of fiber composite material has to be improved to produce protective shells with various appearances.

To overcome the shortcomings of the conventional protective shells made of fiber composite material by the conventional manufacturing method, the present invention provides a composite material shell and a manufacturing method for the same to mitigate or obviate the aforementioned problems.

SUMMARY OF THE INVENTION

The main objective of the present invention is to provide a composite material shell with unique reflection and depth variations of visual effect and to provide options of various appearances of protective shells for customers.

The composite material shell has a base plate made of thermoplastic resin and reinforcing fibers and multiple decorative pieces. Each one of the multiple decorative pieces is made of a composite material containing thermoplastic resin and reinforcing fibers. An area of each one of the multiple decorative pieces is smaller than an area of the base plate, wherein the multiple decorative pieces are non-directionally arranged, are overlapped, and are welded on the base plate.

Other objects, advantages, and novel features of the invention will become more apparent from the following detailed description when taken in conjunction with the accompanying drawings.

DETAILED DESCRIPTION OF PREFERRED EMBODIMENTS

Figure 1:
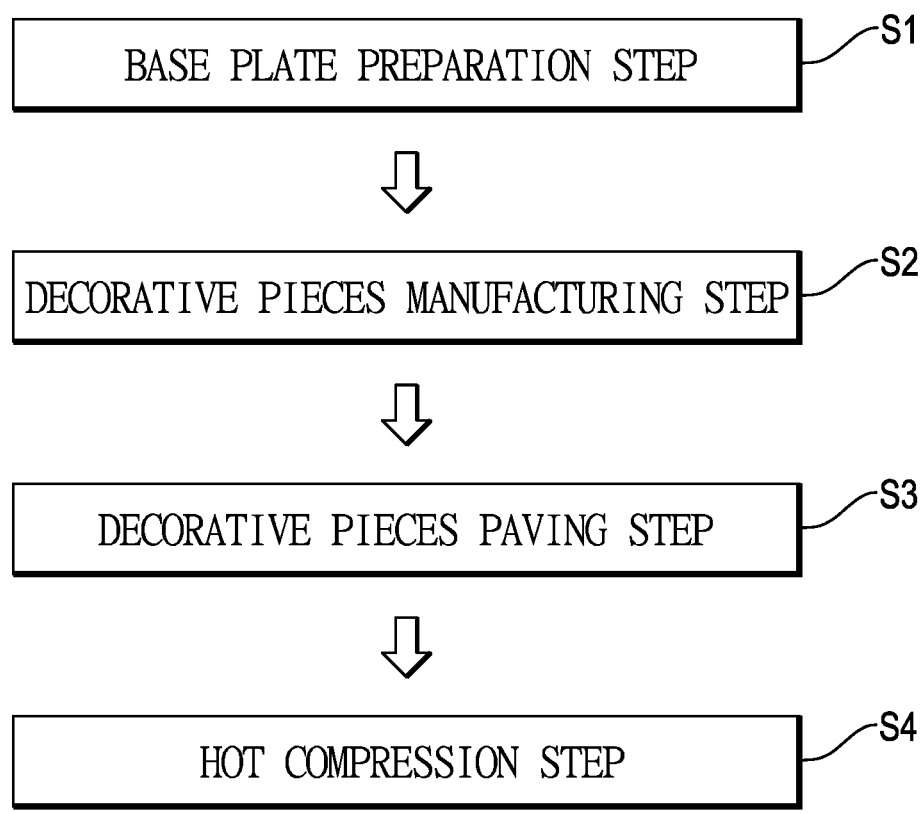
FIG. 1 is a flowchart of a manufacturing method for a composite material shell in accordance with the present invention.

With reference to FIG. 1, a manufacturing method for a composite material shell comprises steps of a base plate preparation step S1, a decorative pieces manufacturing step S2, a decorative pieces paving step S3, and a hot compression step S4.

Figure 2:
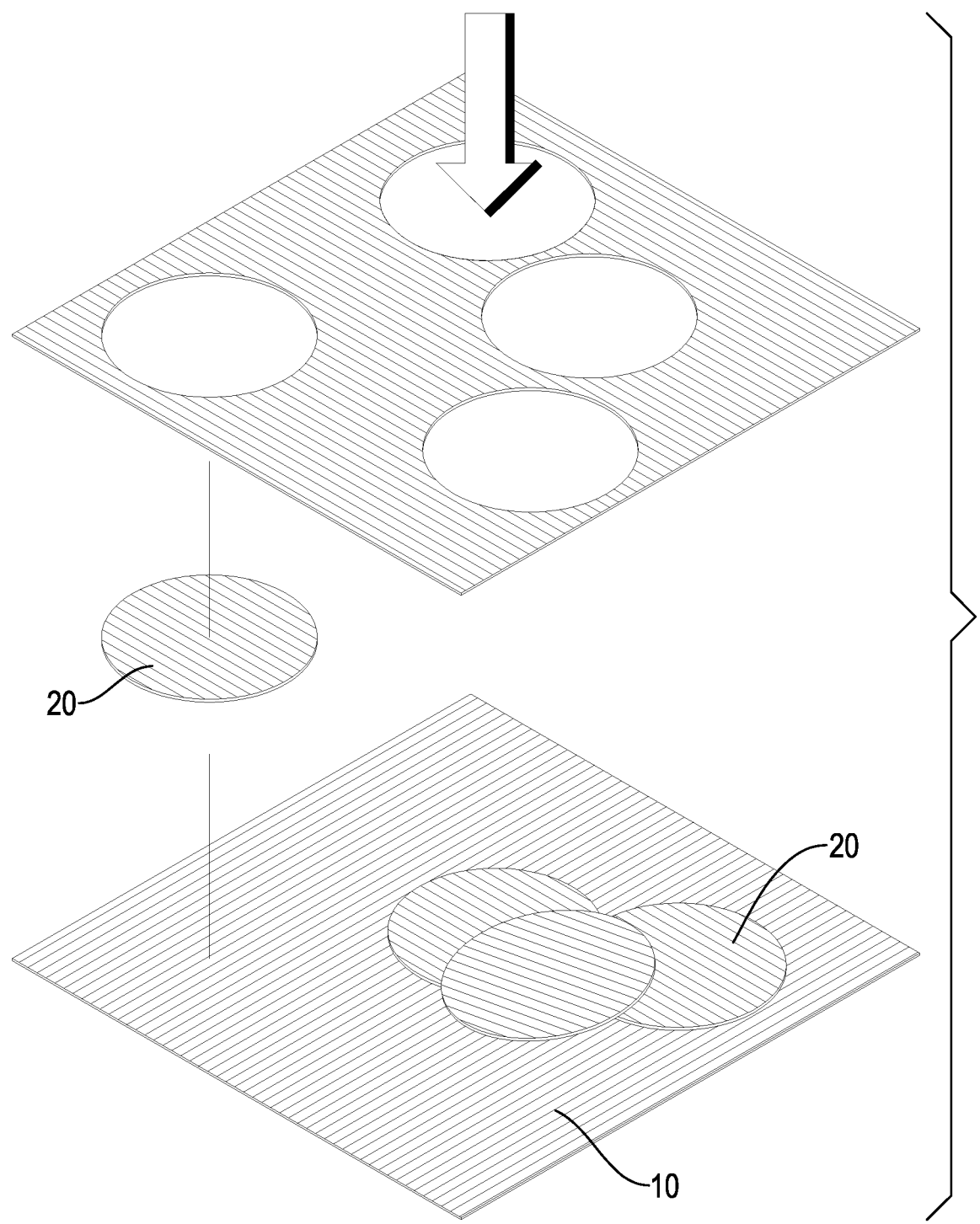
FIG. 2 is a perspective schematic view of the manufacturing method in FIG. 1.
Figure 3:
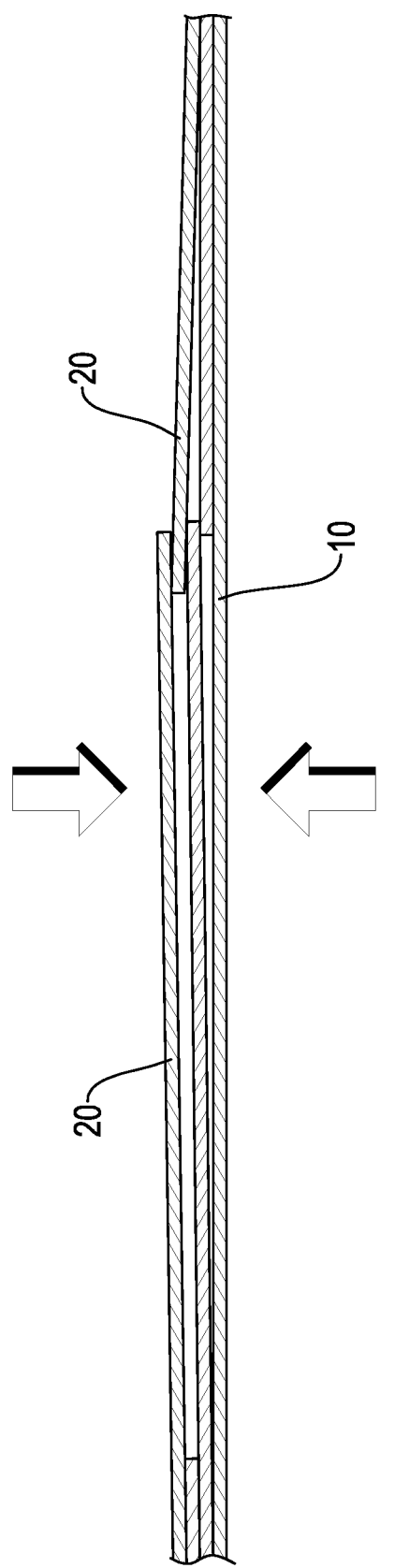
FIG. 3 is a schematic side view of the manufacturing method in FIG. 1.

In the base plate preparation step S1: first of all, a base plate 10 is prepared. The base plate 10 is flat and is composed of laminated prepreg sheets made of polymer matrix and reinforcing fibers. With reference to FIGS. 1 and 2, in the embodiment of the present invention, the polymer matrix is thermoplastic resin, and the reinforcing fibers are carbon fibers. Practically, in addition to the carbon fibers, the reinforcing fibers may also be glass fibers or metal fibers.

In the decorative pieces manufacturing step S2: multiple decorative pieces 20 made of composite material with fibers are prepared. Each of the decorative pieces 20 has an area smaller than an area of the base plate 10. In the embodiment of the present invention, each decorative piece 20 is made of thermoplastic resin and reinforcing fibers 21. The reinforcing fibers of each decorative piece 20 are arranged parallel with one another. The reinforcing fibers of each decorative piece 20 may be, but are not limited to, carbon fibers, glass fibers, or metal fibers.

Figure 5:
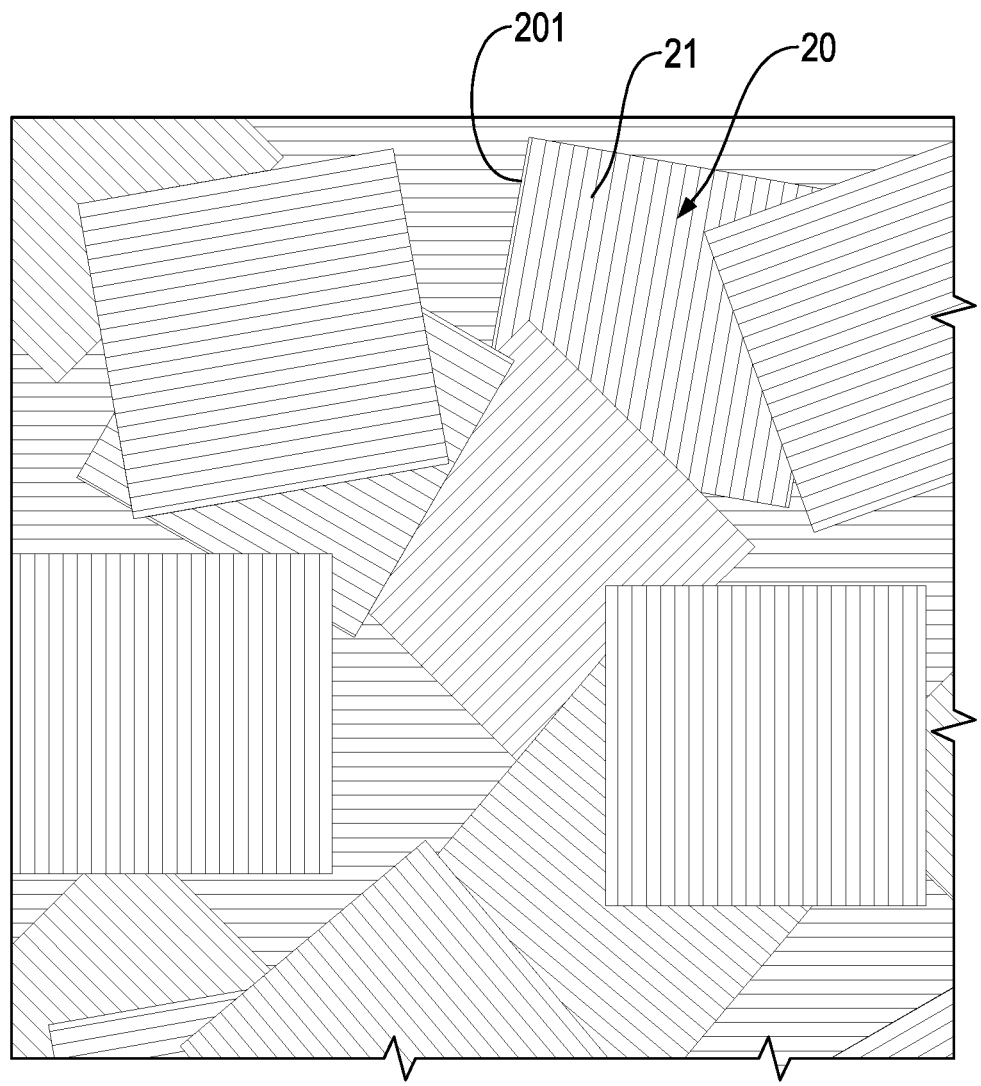
FIG. 5 is an enlarged top view of the composite material shell in FIG. 4, showing each decorative piece being square.
Figure 7:
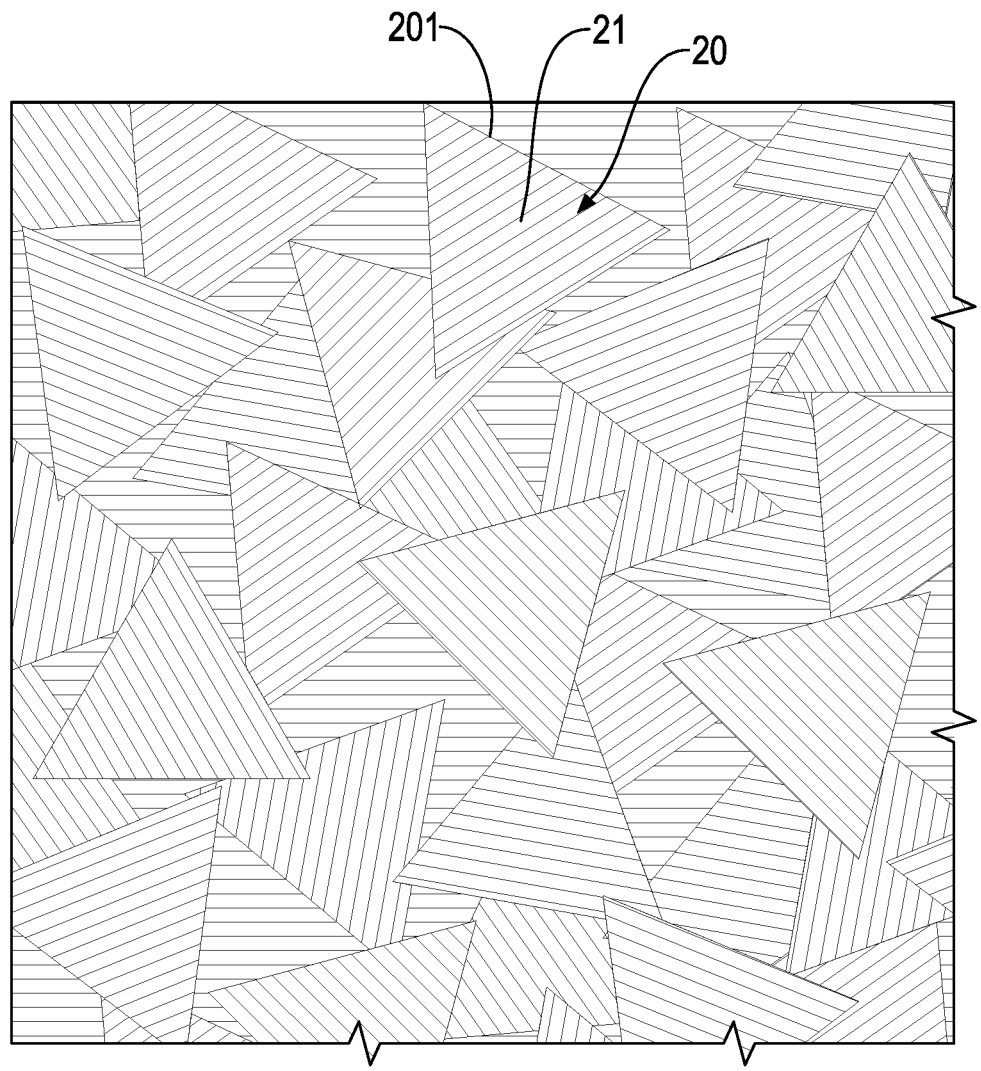
FIG. 7 is an enlarged top view of a composite material shell made by the manufacturing method in FIG. 1, showing each decorative piece being triangular.
Figure 8:
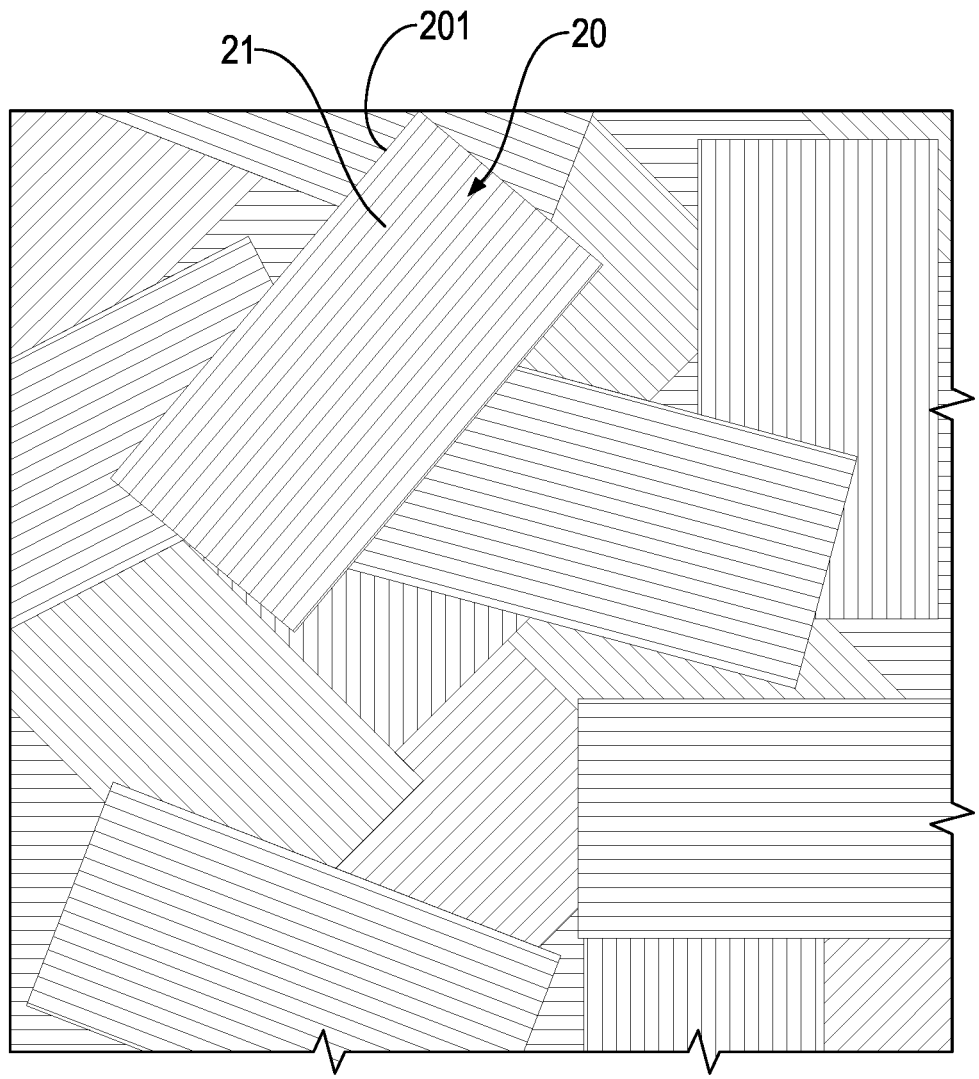
FIG. 8 is an enlarged top view of a composite material shell made by the manufacturing method in FIG. 1, showing each decorative piece being rectangular.

With reference to FIGS. 5, 7, and 8, a contour of each decorative piece 20 may be square, triangular or rectangular. The reinforcing fibers 21 of each decorative piece 20 are parallel to an edge 201 of the decorative piece 20. Practically, when each decorative piece 20 is contoured as a square, triangle, rectangle, or any polygon, the reinforcing fibers of each decorative piece 20 may be non-parallel to the edge 201 of the decorative piece 20. Therefore, an angle is defined between each of the reinforcing fibers 21 and the edge 201 of the decorative piece 20, i.e. each of the reinforcing fibers 21 is non-parallel to the edge 201 of the decorative piece 20, in the decorative pieces manufacturing step S2 for obtaining the decorative pieces 20 with various patterns.

In the decorative pieces paving step S3: the multiple decorative pieces 20 are paved on the base plate 10. The multiple decorative pieces 20 are arranged non-directionally. The multiple decorative pieces 20 are overlapped. The reinforcing fibers of one of the decorative pieces 20 extend non-parallelly with the reinforcing fibers of another one of the decorative pieces. In the decorative pieces paving step S3, an amount of the multiple decorative pieces 20 being overlapped and an area of each two of the multiple decorative pieces 20 being overlapped is adjustable.

In the hot compression step S4: after heating the base plate 10 and the multiple decorative pieces 20, the base plate 10 and the multiple decorative pieces 20 are compressed. The base plate 10 and the multiple decorative pieces 20 are welded together via the thermoplastic resin accordingly.

In an embodiment of the present invention, the base plate preparation step S1 and the decorative pieces manufacturing step S2 may be exchanged. When a composite material shell is manufactured by the manufacturing method of the present invention, either the base plate 10 or the multiple decorative pieces 20 may be prepared at first. As long as the multiple decorative pieces 20 can be paved on the base plate 10 in the decorative pieces paving step S3, the sequence of the base plate preparation step S1 and the decorative pieces manufacturing step S2 is not restricted.

In addition, in the decorative pieces manufacturing step S2, each decorative piece 20 is formed by punching a prepreg sheet by a punching machine. Practically, each decorative piece 20 may also be obtained by other means such as cutting or trimming.

Figure 4:
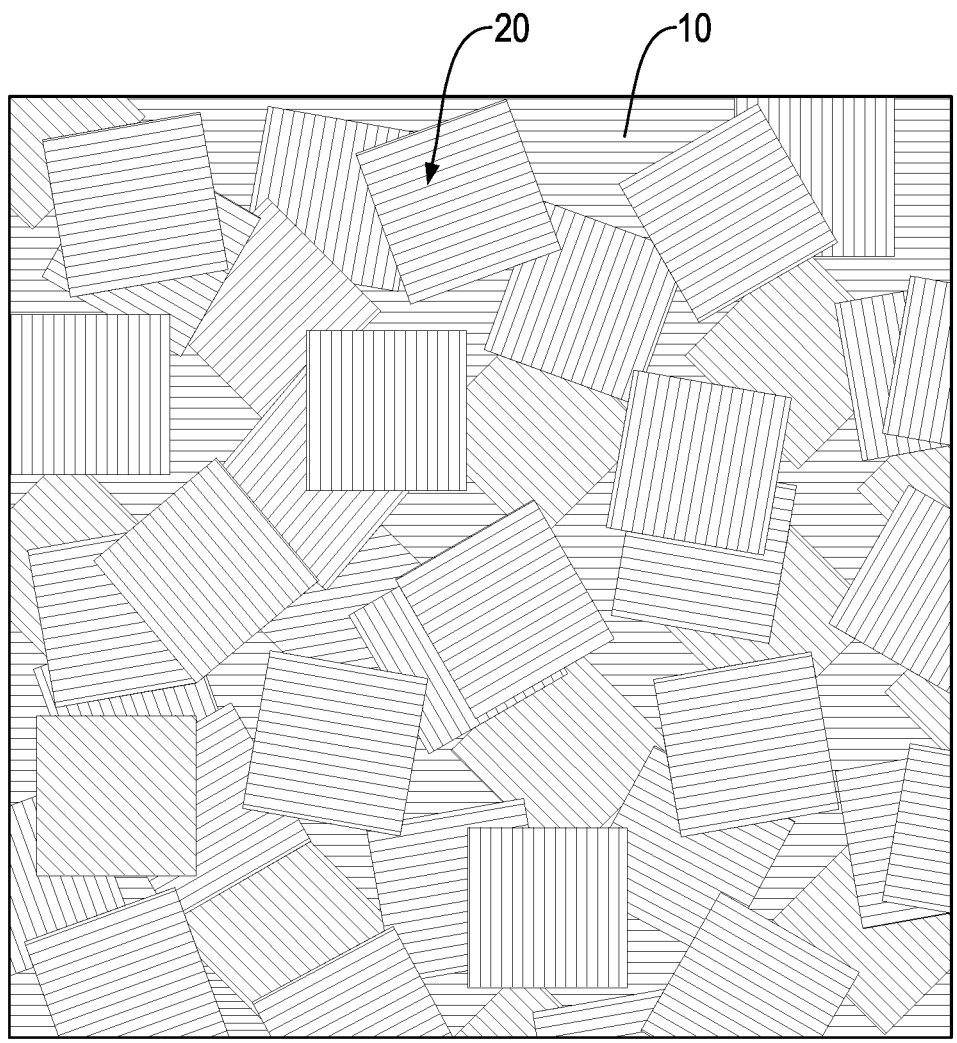
FIG. 4 is a top view of a composite material shell made by the manufacturing method in FIG. 1, showing the composite material shell having multiple decorative pieces.
Figure 6:
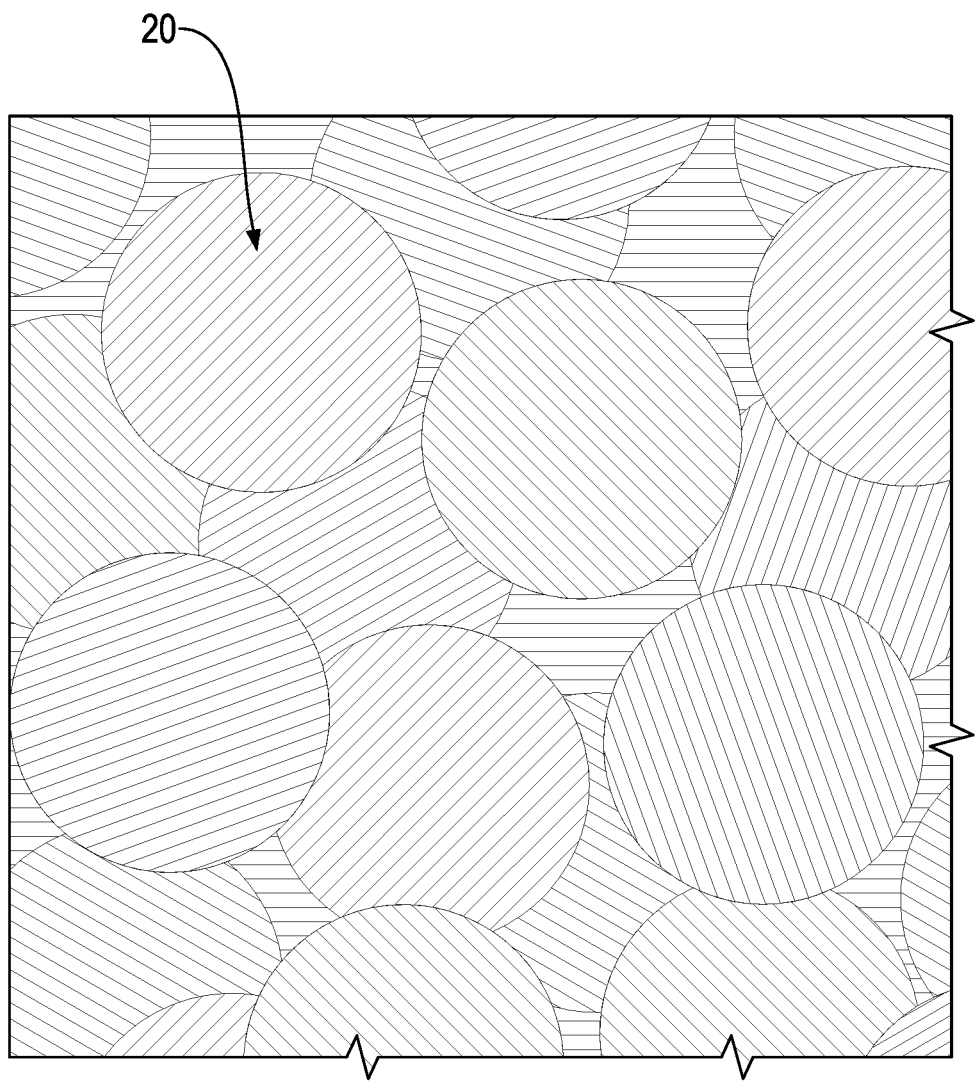
FIG. 6 is an enlarged top view of a composite material shell made by the manufacturing method in FIG. 1, showing each decorative piece being round.

With reference to FIGS. 4 and 5, in the illustrated embodiment of the present invention, a contour of the base plate 10 is rectangular, and the contour of each decorative piece 20 is substantially square. Practically, the contour of the base plate 10 is not restricted. With reference to FIGS. 6 to 8, the contour of each decorative piece 20 may be circular, triangular, rectangular, etc. Practically, each decorative piece 20 may even be contoured as a heart shape, a star shape, a trade mark, a letter, plants or animals, or various natural subjects. When each decorative piece 20 is contoured as a galloping horse or a cloud, the multiple overlapped decorative pieces 20 may even constitute a scene of a herd of galloping horses or show a scene of clouds and mist.

With reference to FIGS. 4 to 7, the composite material shell made by the manufacturing method of the present invention has the multiple decorative pieces 20 being repeatedly and irregularly arranged and provides a customer with appearances different from those of conventional shells made of fiber composite material. Furthermore, the contours of the multiple decorative pieces 20 may be even optionally and respectively selected from the contours mentioned above.

Appearances of the composite material shell made of the manufacturing method of the present invention are not restricted to only regular patterns such as parallel strips or interlacing strips. The multiple decorative pieces 20 of the composite material shell of the present invention may be arranged non-directionally, such that the reinforcing fibers 21 of one of the decorative pieces 20 extend non-parallelly with the reinforcing fibers 21 of another one of the decorative pieces 20 accordingly. When light is emitted to the multiple decorative pieces 20, various reflections of the light are formed. As long as the composite material shell of the present invention is deflected slightly, various reflections of the light are generated and different visual effects are shown.

Figure 9:
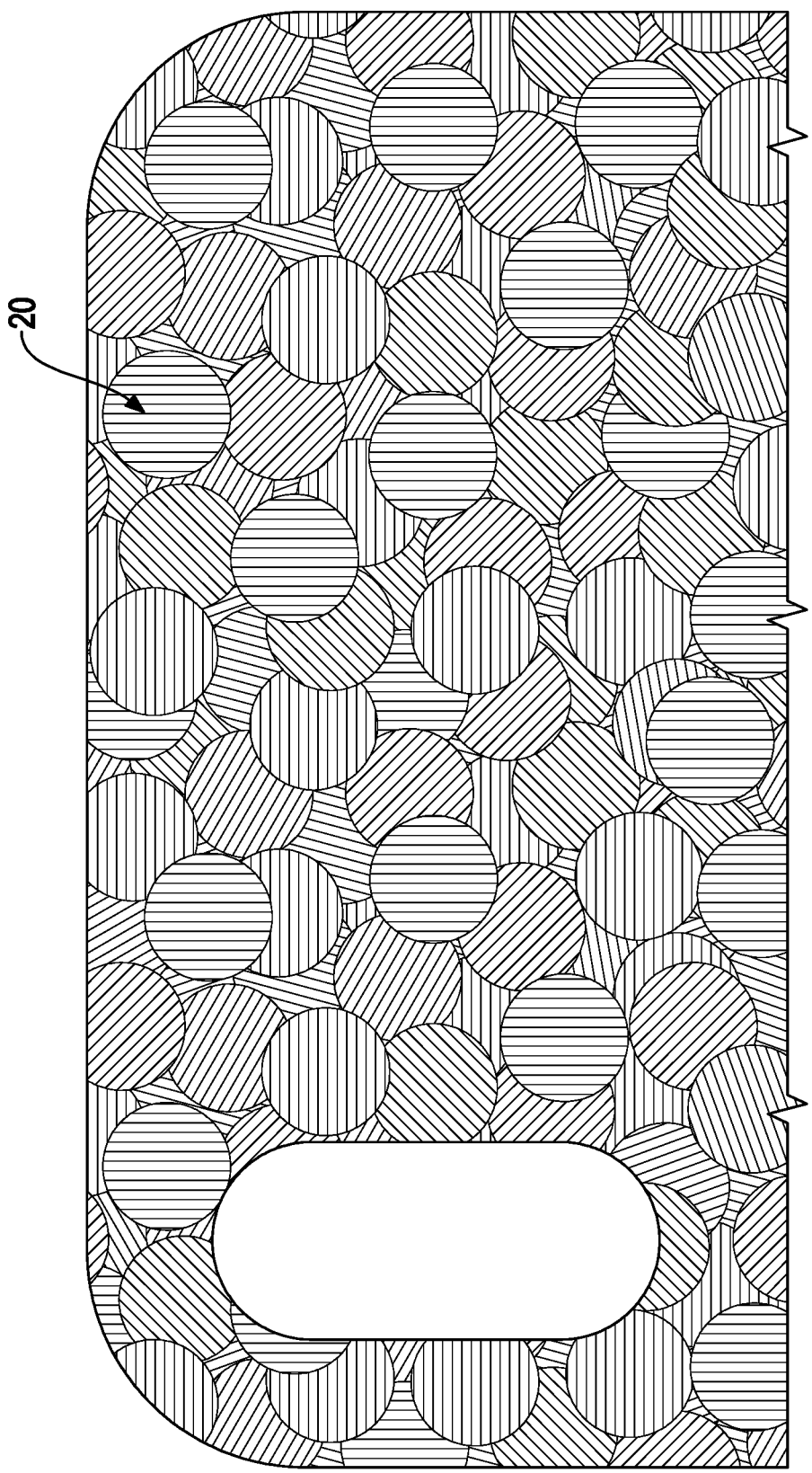
FIG. 9 is an enlarged top view of a phone case made by the manufacturing method in FIG. 1.

Otherwise, with reference to FIGS. 5 to 8, the multiple decorative pieces 20 are overlapped, and visual effects of various depths are formed. Moreover, an amount of the multiple decorative pieces being overlapped and the area of each two of the multiple decorative pieces being overlapped is adjustable in the present invention. Visual effects with various depths are generated in the present invention in addition to the various reflections of light. With respect to two-dimensional visual effects, orientations of the reinforcing fibers 21 of the multiple decorative pieces 20, orientations of the multiple decorative pieces 20, and the contours of the multiple decorative pieces 20 can be optionally adjusted to form various visual effects. Also three-dimensional visual effects of various depths can be formed by adjusting the amount of the multiple decorative pieces being overlapped and the area of each two of the multiple decorative pieces being overlapped. With reference to FIG. 9, the composite material shell made via the manufacturing method of the present invention can be applied to a protective case of a cell phone for protecting the cell phone. The composite material of the present invention may be applied to various protective cases for protecting various electronic devices and provides customers with various unique visual effects.

Even though numerous characteristics and advantages of the present invention have been set forth in the foregoing description, together with details of the structure and features of the invention, the disclosure is illustrative only. Changes may be made in the details, especially in the shape, size, and arrangement of parts within the principles of the invention to the full extent indicated by the broad general meaning of the terms in which the appended claims are expressed.

What is claimed is:

1. A composite material shell comprising: a base plate made of thermoplastic resin and reinforcing fibers; and multiple decorative pieces, wherein each of the decorative pieces is made of a composite material containing thermoplastic resin and parallel reinforcing fibers, an area of each one of the multiple decorative pieces being smaller than an area of the base plate, wherein the multiple decorative pieces are non-directionally arranged such that the reinforcing fibers of each decorative piece extend in a non-parallel alignment with the reinforcing fibers of the other decorative pieces, wherein the multiple decorative pieces are overlapped and are welded on the base plate; wherein the composite material shell is in a configuration capable of enclosing at least a portion of an electronic device.

2. The composite material shell as claimed in claim 1, wherein the reinforcing fibers of the base plate are carbon fibers, glass fibers, or metal fibers.

3. The composite material shell as claimed in claim 2, wherein the reinforcing fibers of each one of the multiple decorative pieces are carbon fibers, glass fibers, or metal fibers.

4. A manufacturing method for a composite material shell comprising: a base plate preparation step: laminating prepreg sheets made of thermoplastic resin and reinforcing fibers to form a base plate; a decorative pieces manufacturing step: preparing multiple decorative pieces made of thermoplastic resin and reinforcing fibers, wherein each decorative piece comprises parallel reinforcing fibers, an area of each one of the multiple decorative pieces being smaller than an area of the base plate; a decorative pieces paving step: paving the multiple decorative pieces on the base plate, the multiple decorative pieces being overlapped, wherein the multiple decorative pieces are non-directionally arranged such that the reinforcing fibers of each decorative piece extend in a non-parallel alignment with the reinforcing fibers of the other decorative pieces; and a hot compression step: heating the base plate and the multiple decorative pieces and compressing the base plate and the multiple decorative pieces thereafter such that the multiple decorative pieces are welded on the base plate and the resulting composite material shell is in a configuration capable of enclosing at least a portion of an electronic device.

5. The manufacturing method for a composite material shell as claimed in claim 4, wherein an angle defined between the reinforcing fibers of each of the decorative pieces and an edge of the decorative piece is adjustable.

6. The manufacturing method for a composite material shell as claimed in claim 4, wherein the number of decorative pieces that are overlapped and the degree of overlapping between the decorative pieces are adjustable.

7. The manufacturing method for a composite material shell as claimed in claim 4, wherein in the decorative pieces manufacturing step, each one of the multiple decorative pieces is formed by punching a prepreg sheet with a punching machine.

8. The manufacturing method for a composite material shell as claimed in claim 6, wherein in the decorative pieces manufacturing step, each one of the multiple decorative pieces is formed by punching a prepreg sheet with a punching machine.

\* \* \* \* \*